United States Patent [19]

Sugiyama et al.

[11] 4,425,162

[45] Jan. 10, 1984

[54] METHOD FOR PROVIDING A COLOR IMAGE BY INK-JET PRINTING

[75] Inventors: Masatoshi Sugiyama; Keiichi Adachi; Eiichi Kato; Akira Ogawa, all of Minami-ashigara; Shinichi Imai, Odawara, all of Japan

[73] Assignee: Fuji Photo Film Co., Ltd., Kanagawa, Japan

[21] Appl. No.: 273,991

[22] Filed: Jun. 15, 1981

[30] Foreign Application Priority Data

Jun. 13, 1980 [JP]  Japan ................................ 55-79923

[51] Int. Cl.$^3$ ........................................... C09D 11/02
[52] U.S. Cl. ........................................ 106/22; 106/20; 106/24; 106/26; 524/612; 524/323; 260/DIG. 38
[58] Field of Search ..................... 106/22, 26, 24, 20; 260/314.5, DIG. 38, 192, 196; 524/612, 323

[56]  References Cited

U.S. PATENT DOCUMENTS 4,111,650  9/1978  La Croix et al. ............... 260/314.5
4,210,582  7/1980  de Montmollin et al. .......... 260/154
4,217,272  8/1980  Crounse .......................... 260/163
4,218,373  8/1980  Wolfrum .......................... 260/198
4,237,050 12/1980  Springer ........................ 260/314.5
4,282,000  8/1981  Groll et al. .................... 260/314.5

FOREIGN PATENT DOCUMENTS 1526017  9/1978  United Kingdom .

Primary Examiner—John Kight, III
Assistant Examiner—Amelia B. Yarbrough
Attorney, Agent, or Firm—Sughrue, Mion, Zinn, Macpeak & Seas

[57]  ABSTRACT

Colored ink useful within an ink-jet printing device is disclosed. The ink is comprised of specifically disclosed yellow dyes, magenta dyes and cyan dyes within an aqueous ink composition. The use of the specific dyes within the aqueous ink composition prevents clogging within the nozzle of the ink-jet printer during operation or after operation has been restarted after a suspension of use of the printer. The ink composition has a high light-fastness characteristic, is not easily discolored by exposure to light and produces faithful color reproduction.

9 Claims, No Drawings

METHOD FOR PROVIDING A COLOR IMAGE BY INK-JET PRINTING

FIELD OF THE INVENTION

This invention relates to a method for providing a color image by ink-jet printing, and more particularly, to a method for providing a color image by ink-jet printing using a combination of preferred aqueous yellow, magenta and cyan ink compositions.

BACKGROUND OF THE INVENTION

There are three typical systems for ink-jet printing. In one system ink droplets are ejected through a small nozzle normally from several microns to several hundreds microns in diameter, and each droplet is imparted a predetermined static charge by electrical signals, then deflected electrostatically between high voltage deflection plates to form a character or figure on a recording medium according to a predetermined dot matrix. In a second system ink droplets are drawn through a small nozzle of the above specified size under the electrostatic control of high-voltage plates, accelerated, and then electrostatically deflected between deflection plates to form a letter or figure on a recording medium according to a predetermined dot matrix. In the third system, ink droplets are ejected in response to electrical signals to form a letter, figure or a picture on a recording medium according to a predetermined dot matrix.

It is important that ink used in ink-jet printing not clog the small nozzle, and that it not form a solid deposit on the inner wall of the nozzle causing a change in the rate of ink injection. These requirements must be met throughout an extended continuous operation of the ink-jet printer, and they must also be met when the operation is restarted after a short or long suspension.

Other important requirements are that the ink not spread on the recording medium and that it provide a light-fast record. This means the recorded image must not dissolve in water and that it must not be discolored by light.

A still further requirement is that ink capable of achieving faithful color reproduction must be used for providing a color image by ink-jet printing.

We have found that whether a particular aqueous ink meets these requirements depends greatly upon the dye used in that ink.

SUMMARY OF THE INVENTION

Therefore, one object of this invention is to provide an improved color ink-jet printing method that does not clog the nozzle assembly of an ink-jet printer during an extended operation of the printer or when the operation is restarted after a short or long suspension, and which does not cause ink to spread on the recording medium and which provides a light-fast image.

The water-soluble dyes conventionally used in ink for ink-jet printing are direct and acid dyes of the type described in Japanese Patent Application (OPI) No. 89534/74 (the symbol "OPI" as used herein means an unexamined published Japanese patent application), Japanese Patent Publication Nos. 16243/79, 16244/79, 16245/79, Japanese Patent Application (OPI) Nos. 96105/77, 146307/77, 77706/78, Japanese Patent Publication No. 21765/79, and Japanese Patent Application (OPI) No. 89811/79. However, ink using these dyes is not completely satisfactory because it sometimes clogs the nozzle during continuous operation or when the operation is restarted after a short or long suspension, or it provides an image that spreads on the recording medium or which is not highly light-fast. As a further disadvantage, the combination of yellow, magenta and cyan ink compositions incorporating these dyes does not always provide a color image having faithful color reproduction.

As a result of various studies to eliminate the defects of conventional dyes for use in color ink-jet printing, we have found an improved method for providing a color image by ink-jet printing that is characterized by using a yellow dye represented by the formula (I), a magenta dye represented by the formula (II), and a cyan dye represented by the formula (III).

Formula (I): yellow dye

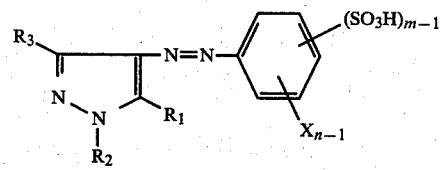

wherein $R_1$ is an amino group or a hydroxy group; $R_2$ is a phenyl group, substituted phenyl group (the substituent being Cl, alkoxy, alkyl, sulfo or carboxyl), ($C_{1-4}$) alkyl group or a substituted ($C_1$–$C_4$) alkyl group (the substituent being sulfo); $R_3$ is a ($C_{1-4}$) alkyl group, phenyl group, substituted phenyl group (the substituent being Cl, alkoxy, alkyl, sulfo or carboxyl), cyano group, hydroxyl group, alkoxy group, amino group, acylamino group, anilino group, ureido group, alkoxycarbonyl group or a carbamoyl group; X is a chlorine atom; n is 1, 2 or 3; and m is 1, 2 or 3; the number of sulfo groups in the formula (I) is from 1 to 3.

Formula (II): magenta dye

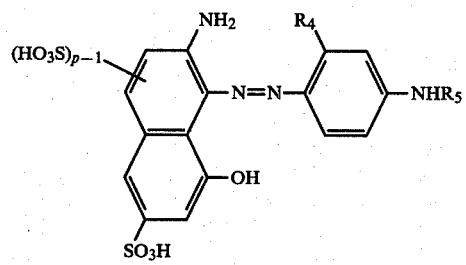

wherein $R_4$ is a cyano group, alkylsulfonyl group, arylsulfonyl group, trichloromethyl group or a trifluoromethyl group; $R_5$ is a hydrogen atom, alkyl group, acyl group, alkylcarbamoyl group or an arylcarbamoyl group; and p is 1 or 2.

Formula (III): cyan dye

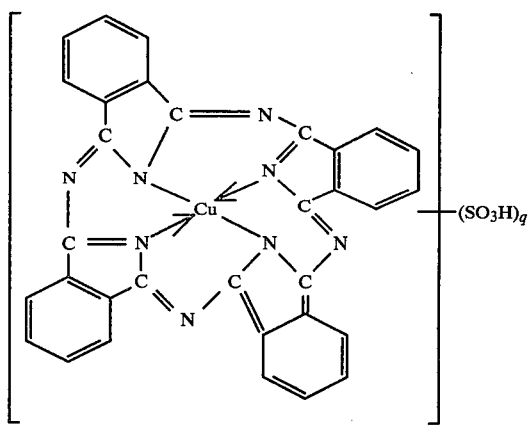

wherein q is 1, 2, 3 or 4.

In the formulae (I) to (III), the sulfo group may be an alkali metal salt (e.g., sodium or potassium salt), or an organic amine salt (e.g., triethylamine salt, pyridine salt, triethanolamine salt or ammonium salt).

In the formula (I), $R_1$ is preferably an amino group or hydroxyl group, and an amino group is particularly preferred; $R_2$ is preferably a phenyl group, a chloro-substituted phenyl group, a sulfo-substituted phenyl group, a ($C_{1-4}$) alkyl group or a sulfo-($C_1$–$C_4$) alkyl group, and a phenyl group, a chloro- or sulfo-substituted phenyl group is particularly preferred; $R_3$ is preferably a ($C_1$–$C_4$) alkyl group, a phenyl group, a cyano group, a hydroxy group or an amino group, with a ($C_1$–$C_4$) alkyl group or phenyl group being particularly preferred; X is preferably a chlorine atom; n is preferably 2 or 3; and m is preferably 2. The number of sulfo groups in the formula (I) is preferably 1 or 2.

In the formula (II), $R_4$ is preferably a cyano group or a ($C_1$–$C_3$) alkylsulfonyl group; $R_5$ is preferably a hydrogen atom; and p is preferably 1 or 2.

In formula (III), q is preferably 4.

Some examples of the useful yellow, magenta and cyan dyes to be incorporated in the ink for ink-jet printing according to this invention are given below, but it should be understood that the dyes that can be used in this invention are by no means limited to these examples.

Yellow dyes:

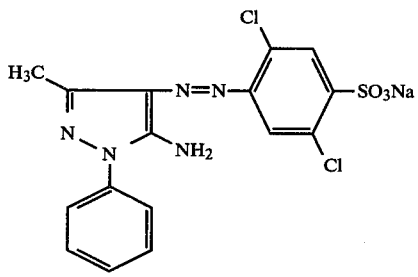

Y-1

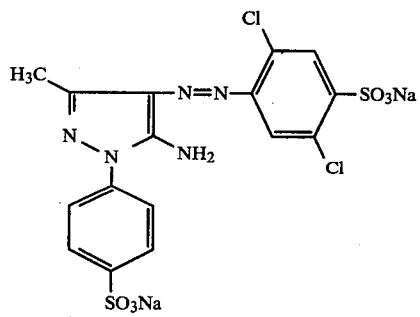

Y-2

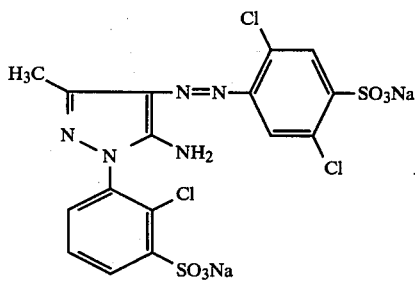

Y-3

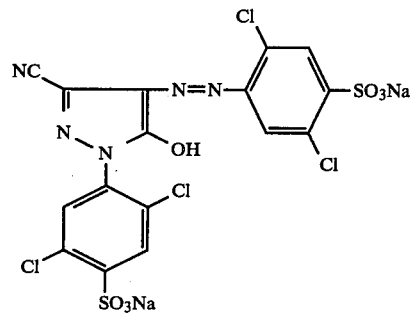

Y-4

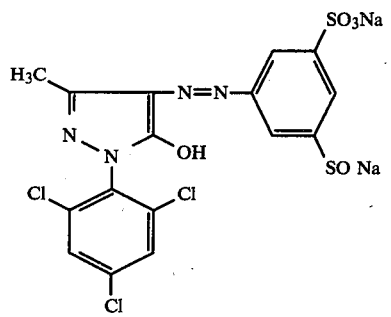

Y-5

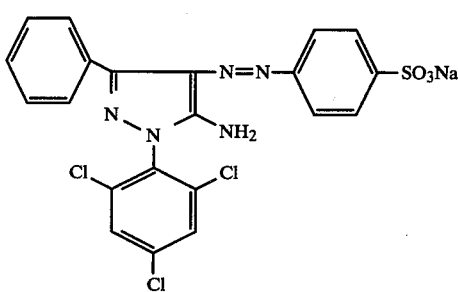

Y-6

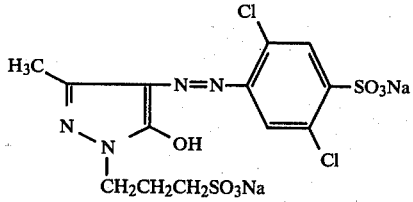
Y-7

Magenta dyes:

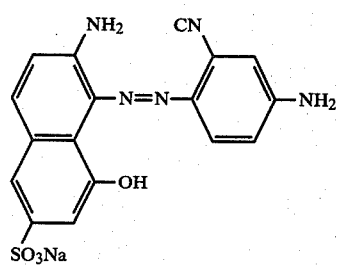
M-1

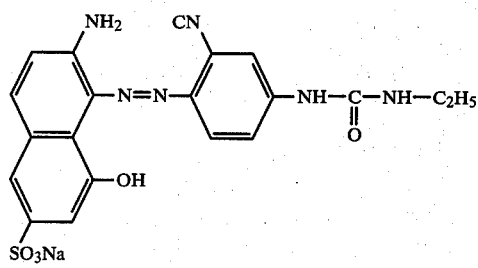
M-2

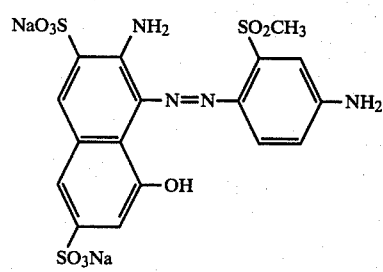
M-3

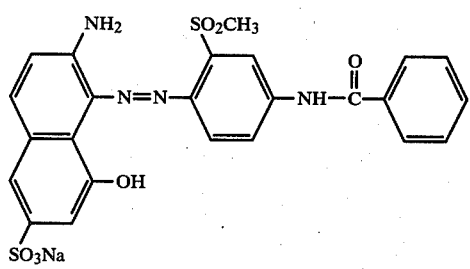
M-4

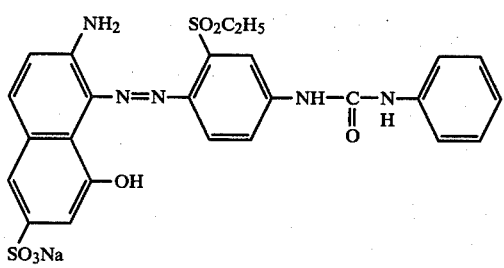
M-5

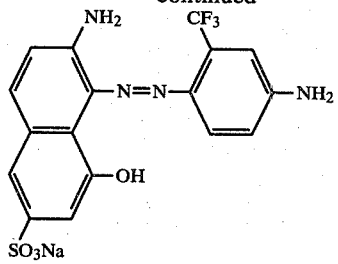
M-6

M-7

Cyan dye:

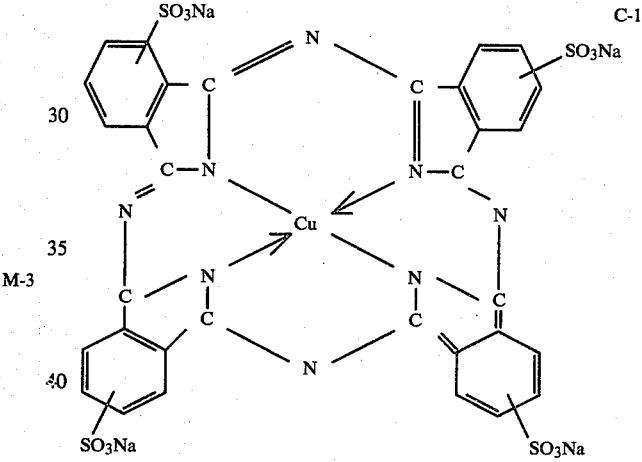
C-1

These water-soluble dyes are incorporated in the respective ink compositions for use in this invention generally in an amount of 0.5 to 4 wt% based on 100 parts by weight of the ink composition. If the dyes are used in an amount of less than 0.5 part by weight, they do not work as a colorant satisfactorily, and if they are used in an amount of more than 4 parts by weight, they come out of solution as time goes by and form a precipitate that clogs the nozzle.

A wetting agent is incorporated in the respective ink compositions for use in ink-jet printing according to this invention. The wetting agent is included in order to improve the resistance of the ink compositions to dryness and to aid the dissolution of the dyes. A preferred wetting agent is substantially nonvolatile at room temperature. A 3 to 40 wt% aqueous solution of the wetting agent has a surface tension of at least 30 dynes/cm, preferably at least 45 dynes/cm, a viscosity of less than 50 cPs, at room temperature (e.g., about 20°–30° C.) and has at least 1 wt% of the aforementioned water-soluble dyes dissolved therein at room temperature. Preferred examples of such wetting agent are listed below: 2-pyrrolidones of the type described in Japanese Patent Application (OPI) Nos. 71423/75, 5127/76 and 137505/76;

carboxylic acid amide derivatives of the type described in Japanese Patent Application (OPI) Nos. 97620/74, 8031/76 and 8033/76; dioxyethylene sulfur compounds of the type described in Japanese Patent Application (OPI) No. 5129/76; alcohol amines of the type described in Japanese Patent Application (OPI) No. 52004/76; N-formyl-lactam derivatives of the type described in Japanese Patent Application (OPI) No. 31525/76; polyalkylene glycols and monoesters thereof of the type described in Japanese Patent Publication No. 40484/76, Japanese Patent Application (OPI) Nos. 137506/76 and 12909/79; monovalent alcohols such as t-butyl alcohol and n-amyl alcohol of the type described in Japanese Patent Application (OPI) No. 129310/76; cellulose derivatives (e.g., hydroxypropyl cellulose) and polyvinyl alcohol of the type described in Japanese Patent Application (OPI) No. 17840/75; polyoxyethylene sorbitan aliphatic acid ester, polyoxyethylene aliphatic acid ester and polyoxyethylene alkylphenyl ether of the type described in Japanese Patent Application (OPI) No. 143602/75; water-soluble alginates of the type described in Japanese Patent Application (OPI) No. 62005/79; and 1,3-dialkyl-2-imidazolidinones such as N,N'-dimethyl-1,3-imidazolidinone-(2). The amount of the wetting agent used in this invention varies with the type of the agent, and it is preferably within the range of from 0.2 to 30 wt% based on 100 parts by weight of the ink composition. The wetting agents illustrated above may be used either alone or in combination.

The ink compositions according to this invention may also contain a black dye. Examples of the effective black dye are direct and acid dyes described in Japanese Patent Application (OPI) Nos. 15622/75, 17840/75, 49004/75, 5127/76, 5128/76, 52004/76, 137506/76, 61412/78, 77706/78, and Japanese Patent Publication No. 16243/79.

The ink compositions according to this invention may also contain a mold inhibitor and an oxygen absorber. Examples of the effective mold inhibitor include sodium dehydroacetate of the type described in Japanese Patent Application (OPI) No. 12008/77; 1,2-benzisothiazolin-3-one of the type described in Japanese Patent Application (OPI) No. 12009/77; 6-acetoxy-2,4-dimethyl-m-dioxane of the type described in Japanese Patent Application (OPI) Nos. 12010/77 and 96105/77; formalin and pentachlorophenol sodium of the type described in Japanese Patent Application (OPI) No. 15622/75; sodium benzoate of the type described in Japanese Patent Application (OPI) No. 30019/76; and citric acid salt of 8-quinolinol of the type described in Japanese Patent Application (OPI) No. 135707/78. Examples of the effective oxygen absorber are sulfites such as sodium sulfite and sodium hydrogensulfite of the type described in Japanese Patent Application (OPI) Nos. 74406/77 and 61412/78.

The ink compositions according to this invention may also contain a surface tension modifier. Examples of the surface tension modifier include an anionic surfactant (e.g., sodium salt of alkylsulfate ester), a cationic surfactant (e.g., alkylpyridinium sulfate salt), a nonionic surfactant (e.g., polyoxyethylene alkyl ether), and an amphoteric surfactant.

The method of this invention can be implemented with any type of ink-jet printer, for instance, an ink-jet printer of the type described in U.S. Pat. No. 3,298,030 wherein injection of ink droplets is controlled by electrostatic charge, or a system of the type described in U.S. Pat. No. 3,747,120 wherein ink droplets are ejected under pressure in response to electrical pulses.

Any recording paper generally used in ink-jet printing can be used for performing ink-jet printing according to the method of this invention, and a particularly preferred example is "coated paper" which comprises a paper base coated with a clay layer or the like. For more details of "coated paper," reference can be had to the description in Japanese Patent Application Nos. 52114/79 and 54300/79.

This invention is now described in greater detail by reference to the following examples which are given here for illustrative purposes only and are by no means intended to limit the scope of the invention. In the examples, all parts are by weight.

EXAMPLE 1

Preparation of Yellow Ink

A blend of the formulation indicated below was heated at 40° to 50° C. under stirring for 1 hour, and the resulting mixture was passed through a micro-filter of FM type (the product of Fuji Photo Film Co., Ltd., thickness$=0.8\mu$, pore size$=47\mu$) at 3 kg/cm$^2$ to prepare a yellow ink composition.

Dye (Y-1): 2.8 parts
Diethylene glycol: 1.0 parts
2,2'-Thiodiethanol: 16.0 parts
Noigen p (a nonionic surfactant produced by Dai-Ichi Kogyo Seiyaku Co., Ltd.): 0.2 part
Water: 80.0 parts

EXAMPLE 2

Preparation of Yellow Ink

A yellow ink composition was prepared by repeating the procedure of Example 1 except that the dye Y-1 was replaced by a dye Y-2.

EXAMPLE 3

Preparation of Magenta Ink

A magenta ink composition was prepared from a blend of the following formulation by repeating the procedure of Example 1.

Dye (M-1): 1.2 part
Diethylene glycol monoethyl ether: 0.5 part
N-Methyl-2-pyrrolidone: 15.0 parts
Noigen P: 0.3 part
Water: 83.0 parts

EXAMPLE 4

Preparation of Magenta Ink

A magenta ink composition was prepared by repeating the procedure of Example 3 except that the dye M-1 was replaced by a dye M-3.

EXAMPLE 5

Preparation of Cyan Ink

A cyan ink composition was prepared from a blend of the following formulation by repeating the procedure of Example 1.

Dye (C-1): 2.4 parts
Diethylene glycol monobutyl ether: 0.5 part
N-Methyl-2-pyrrolidone: 10.0 parts
N-Hydroxyethyl lactamide: 5.0 parts
Noigen p: 0.1 part
Water: 82.0 parts Comparative ink compositions were prepared by using the known dyes indicated below.

Comparative Dye 1: described in Japanese Patent Application (OPI) No. 89811/79

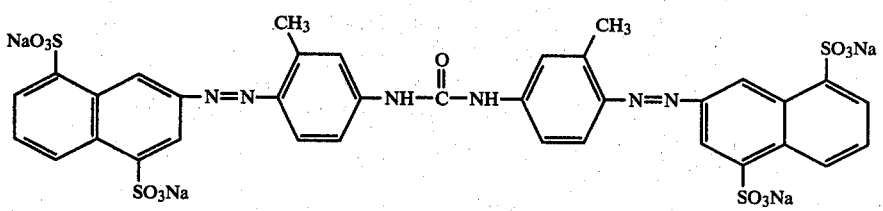

Comparative Dye 2: described in Japanese Patent Publication No. 16245/79

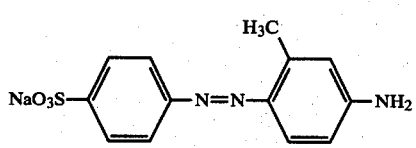

Comparative Dye 3: described in Japanese Patent Application (OPI) No. 89811/79

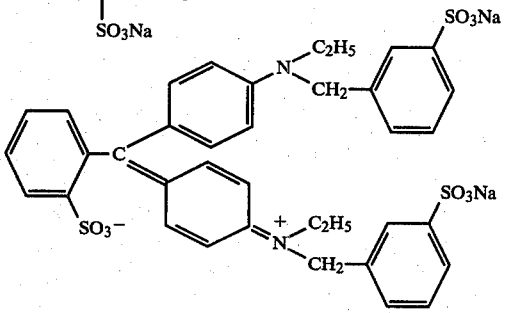

Comparative Dye 6: described in Japanese Patent Application (OPI) No. 12008/77

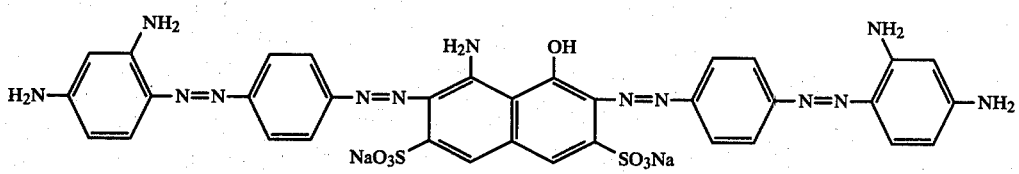

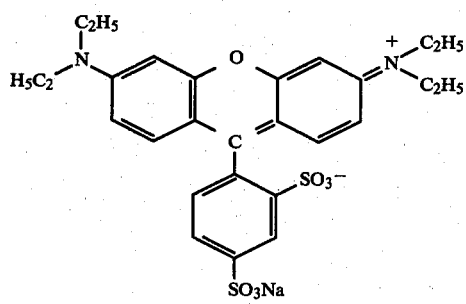

Comparative Dye 4: described in Japanese Patent Application (OPI) No. 89534/74

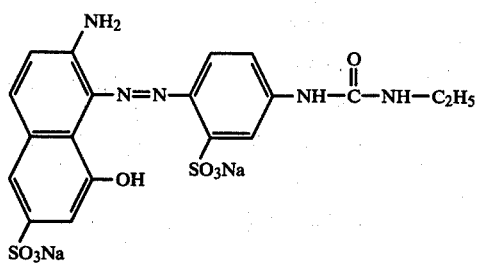

Comparative Dye 5: described in Japanese Patent Application (OPI) No. 89811/79

COMPARATIVE EXAMPLE 1

A comparative ink composition was prepared from a blend of the following formulation by repeating the procedure of Example 1.
Comparative Dye 1: 1.4 parts
Diethylene glycol: 1.0 part
Beta-thiodiglycol: 10.0 parts
N-methyl pyrrolidone: 6.0 parts
Noigen p: 0.2 part
Water: 80.0 parts

COMPARATIVE EXAMPLE 2

A comparative ink composition was prepared by repeating the procedure of Comparative Example 1 except that Comparative dye 1 was replaced by 1.5 parts of Comparative dye 2.

COMPARATIVE EXAMPLE 3

A comparative ink composition was prepared by repeating the procedure of Comparative Example 1 except that Comparative dye 1 was replaced by 1.8 parts of Comparative dye 3.

COMPARATIVE EXAMPLE 4

A comparative ink composition was prepared by repeating the procedure of Example 3 except that Dye M-1 was replaced by 1.2 parts of Comparative dye 4.

COMPARATIVE EXAMPLE 5

A comparative ink composition was prepared by repeating the procedure of Example 5 except that Dye C-1 was replaced by 2.0 parts of Comparative dye 5.

COMPARATIVE EXAMPLE 6

A comparative ink composition was prepared by repeating the procedure of Example 5 except that Dye C-1 was replaced by 1.5 parts of Comparative dye 6.

Table 1 below shows the physical properties and performance of the ink compositions prepared in Examples 1–5 and Comparative Examples 1–6, as well as the quality of the image formed of those ink compositions on fine paper by ink-jet printing.

TABLE 1

| Example and Comparative Example No. | Viscosity C.p.s (25° C.) | Surface Tension dyn/cm (25° C.) | Storage Stability of Ink (1 mo. at 5° C.) | Nozzle Clogging[1] | Light-Fastness (percent residual dye) Upon Exposure to Xenon Lamp (20,000 lux for 5 days) | Image Quality (hue, ink spread) |
|---|---|---|---|---|---|---|
| Example 1 | 2.15 | 43.4 | good | No | 94.6% | sharp yellow |
| Example 2 | 2.08 | 43.0 | " | No | 98.8 | " |
| Example 3 | 2.41 | 46.5 | " | No | 92.0 | sharp magenta |
| Example 4 | 2.38 | 47.8 | " | No | 94.2 | " |
| Example 5 | 2.35 | 45.0 | " | No | 91.0 | sharp cyan |
| Comp. Example 1 | 2.69 | 42.0 | dye precipitated | Yes | 81.0 | orangewish yellow |
| Comp. Example 2 | 2.08 | 45.0 | good | No | 20.0 | yellow |
| Comp. Example 3 | 2.84 | 44.3 | " | Yes | 41.0 | sharp magenta |
| Comp. Example 4 | 2.26 | 46.4 | " | No | 89.4 | red-tinted magneta, ink spread on recording paper |
| Comp. Example 5 | 2.90 | 43.8 | " | Yes | 35.0 | cyan |
| Comp. Example 6 | 3.15 | 42.0 | dye precipitated | Yes | 46.0 | black |

Note:
[1] Check was made to see if ink clogged the nozzle of an ink-jet printer which was restarted after a 10-day suspension.

As is clear from Table 1, the ink compositions of Examples 1–5 incorporating the dyes specified herein had high storage stability and did not clog the nozzle of the ink-jet printer. The image formed of those ink compositions did not spread on the recording paper and had a high lightfastness characteristic.

To check the quality of the color image formed from three color ink compositions, yellow, magenta and cyan ink compositions according to this invention were combined to form a color image on fine paper by ink-jet printing. As a control, two combinations of comparative yellow, magenta and cyan ink compositions were used to form a color image in the same manner as described above.

Aqueous ink according to this invention

Yellow ink (Example 1)
Magenta ink (Example 3)
Cyan ink (Example 5)

Comparative ink

Yellow ink (Comparative Example 1)
Magenta ink (Comparative Example 3)
Cyan ink (Comparative Example 5)

Comparative ink with cyan ink of the invention

Yellow ink (Comparative Example 1)
Magenta ink (Comparative Example 4)
Cyan ink (Example 5)

The combination of the yellow, magenta and cyan ink compositions according to this invention provided a color image which was sharper, more faithful in color reproduction and was more light-fast than the color image formed by the combination of the comparative yellow, magenta and cyan ink compositions.

While the invention has been described in detail and with reference to specific embodiments thereof, it will be apparent to one skilled in the art that various changes and modifications can be made therein without departing from the spirit and scope thereof.

What is claimed is:

1. A method for providing a color image by ink-jet printing using an aqueous ink composition containing a yellow dye, an aqueous ink composition containing a magenta dye and an aqueous ink composition containing a cyan dye, said yellow dye being selected from among the compounds of the formula (I), said magenta dye being selected from among the compounds of the formula (II), and said cyan dye being selected from among the compounds of the formula (III):

$$\text{(I)}$$

wherein $R_1$ is an amino group; $R_2$ is a phenyl group, a substituted phenyl group, a ($C_1$-$C_4$) alkyl group or a substituted ($C_1$-$C_4$) alkyl group; $R_3$ is a ($C_1$-$C_4$) alkyl group, a phenyl group, a substituted phenyl group, a cyano group, a hydroxyl group, an alkoxy group, an amino group, an acylamino group, an anilino group, a ureido group, an alkoxycarbonyl group or a carbamoyl group; X is a chlorine atom; n is 1, 2 or 3; and m is 1, 2 or 3, the number of sulfo groups in the formula (I) is 1 to 3, provided that sulfo groups in the formula (I) may be an alkali metal salt or an organic amine salt;

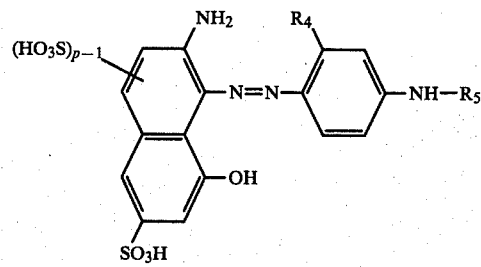

(II)

wherein $R_4$ is a cyano group, an alkylsulfonyl group, an arylsulfonyl group, a trichloromethyl group or a trifluoromethyl group; $R_5$ is a hydrogen atom, an alkyl group, an acyl group, an alkylcarbamoyl group or an arylcarbamoyl group; and p is 1 or 2, provided that sulfo groups in the formula (II) may be an alkali metal salt or an organic amine salt; and

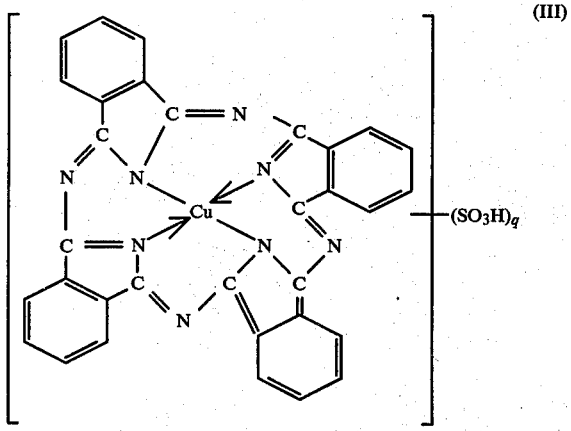

(III)

wherein q is 1 to 4, provided that sulfo groups in the formula (III) may be an alkali metal salt or an organic amine salt.

2. A method as in claim 1, wherein $R_1$ is an amino group; $R_2$ is a phenyl group, a chloro-substituted phenyl group, a sulfo-substituted phenyl group, a ($C_1$–$C_4$) alkyl group or a sulfo-($C_1$–$C_4$) alkyl group; $R_3$ is a ($C_1$–$C_4$) alkyl group, a phenyl group, a cyan group, a hydroxyl group or an amino group; X is a chlorine atom; n is 2 or 3; and m is 2.

3. A method as in claim 2, wherein $R_1$ is an amino group; $R_2$ is a phenyl group, a chloro- or sulfo-substituted phenyl group; and $R_3$ a ($C_1$–$C_4$) alkyl group or an amino group.

4. A method as in claim 1, wherein $R_4$ is a cyano group or a ($C_1$–$C_3$) alkylsulfonyl group; $R_5$ is a hydrogen atom; and p is 1 or 2.

5. A method as in claim 1, wherein q is 4.

6. A method as in claim 1, wherein said aqueous ink composition further contains a wetting agent.

7. A method as in claim 6, wherein said wetting agent has a surface tension of at least 30 dynes/cm and a viscosity of less than 50 cPs at room temperature in a 3 to 40 wt% aqueous solution thereof.

8. A method as in claim 6, wherein said wetting agent is one selected from the group consisting of a 2-pyrrolidone, a carboxylic acid amide derivative, a dioxyethylene sulfur compound, an alcohol amine, an N-formyllactam derivative, a polyalkylene glycol or a monoester thereof, a monovalent alcohol, a cellulose derivative, a polyvinyl alcohol, a polyoxyethylene sorbitan aliphatic acid ester, a polyoxyethylene aliphatic acid ester, a polyoxyethylene alkylphenyl ether, a water-soluble alginate and a 1,3-dialkyl-2-imidazolidinone.

9. A method as in claim 6, wherein said wetting agent is one selected from the group consisting of a 2-pyrrolidone, a 1,3-dialkyl-2-imidazolidinone and a dioxyethylene sulfur compound.

* * * * *